United States Patent
Zhou

(10) Patent No.: US 9,882,951 B2
(45) Date of Patent: Jan. 30, 2018

(54) METHOD AND DEVICE FOR PLAYING STREAMING MEDIA, AND NON-TRANSITORY STORAGE MEDIUM

(71) Applicant: TENCENT TECHNOLOGY (SHENZHEN) COMPANY LIMITED, Shenzhen, Guangdong (CN)

(72) Inventor: Hongquan Zhou, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 156 days.

(21) Appl. No.: 14/691,961

(22) Filed: Apr. 21, 2015

(65) Prior Publication Data

US 2015/0229688 A1 Aug. 13, 2015

Related U.S. Application Data

(63) Continuation of application No. PCT/CN2014/073604, filed on Mar. 18, 2014.

(30) Foreign Application Priority Data

Jun. 20, 2013 (CN) .......................... 2013 1 0246666

(51) Int. Cl.
    *G06F 15/16* (2006.01)
    *H04L 29/06* (2006.01)
    *H04L 29/08* (2006.01)

(52) U.S. Cl.
    CPC .......... *H04L 65/60* (2013.01); *H04L 65/4084* (2013.01); *H04L 65/604* (2013.01); *H04L 67/02* (2013.01); *H04L 67/06* (2013.01)

(58) Field of Classification Search
    CPC .............................. H04L 65/60; H04L 67/06
    (Continued)

(56) References Cited

U.S. PATENT DOCUMENTS

2009/0282076 A1    11/2009 Werstiuk et al.

FOREIGN PATENT DOCUMENTS

CN    101917388 A    12/2010
CN    102118428 A    7/2011
(Continued)

OTHER PUBLICATIONS

International Search Report dated Jun. 27, 2014 in International Application No. PCT/CN2014/073604, filed Mar. 18, 2014.
(Continued)

*Primary Examiner* — Glenford Madamba
(74) *Attorney, Agent, or Firm* — Knobbe Martens Olson & Bear LLP

(57) ABSTRACT

The present invention discloses a method and a device for playing streaming media, and a non-transitory storage medium, and the method comprises: obtaining an index file of a media stream, wherein the media stream includes the index file and at least two slice files, and time information and address information of each of the at least two slice files are recorded in the index file; obtaining all slice files of the media stream according to the index file; combining and converting all the slice files obtained into a local media file; and playing the local media file by a local media player, wherein, the local media file is of a format supported by the local media player. By the present invention, a media stream of a format not supported by the local media player can be played by the local media player.

13 Claims, 4 Drawing Sheets

(58) Field of Classification Search
USPC .......................................................... 709/219
See application file for complete search history.

(56) References Cited

FOREIGN PATENT DOCUMENTS

| CN | 102378043 | A |   | 3/2012 |
|----|-----------|---|---|--------|
| CN | 102624752 | A |   | 8/2012 |
| CN | 102740125 | A |   | 10/2012 |
| CN | 102957672 | A | * | 3/2013 |
| CN | 103024528 | A | * | 4/2013 |
| CN | 103078847 | A | * | 5/2013 |

OTHER PUBLICATIONS

Office Action with Translation Issued in Chinese Application No. 201310246666.0 dated Jul. 19, 2017, 17 pages.

* cited by examiner

METHOD AND DEVICE FOR PLAYING STREAMING MEDIA, AND NON-TRANSITORY STORAGE MEDIUM

CROSS-REFERENCE TO RELATED APPLICATION

This application claims priority to and is a continuation application of PCT/CN2014/073604, filed on Mar. 18, 2014 and entitled "METHOD AND DEVICE FOR PLAYING STREAMING MEDIA, AND NON-TRANSITORY STORAGE MEDIUM", which claims the benefit of Chinese Application No. 201310246666.0, filed on Jun. 20, 2013 by Tencent Technology (Shenzhen) Co., Ltd., entitled "METHOD AND DEVICE FOR PLAYING STREAMING MEDIA", the contents of which are incorporated herein by reference in their entirety.

FIELD OF THE INVENTION

The present disclosure relates to the field of information technologies, particularly to the field of streaming media technologies, and more particularly to a method and a device for playing streaming media, and a non-transitory storage medium.

BACKGROUND OF THE INVENTION

At present, one of the most important functions of user equipment such as an intelligent mobile phone, a desk-top computer and a laptop computer is to obtain and play streaming media from the Internet. The traditional streaming media transmission is realized based on a special streaming media transmission protocol, for example, Routing Table Maintenance Protocol (RTMP), Real Time Streaming Protocol (RTSP), Multimedia Message Service (MMS) Protocol, etc. However, when the transmission of streaming media is based on these special streaming media transmission protocols in the actual network environment, an efficient network path for data transmission typically cannot be established due to the existence of a firewall and a Network Address Translation (NAT) router.

In view of this, Apple Inc. has put forward the HTTP Live Streaming (HLS) protocol, according to which, a continuous media stream is sliced into multiple Transport Stream (TS) slice files, and an M3U8 index file (i.e. a playlist file) is generated correspondingly, and the TS slice files and the M3U8 index file are stored in an HTTP server. The TS slice files and the M3U8 index file constitute an HLS media stream. In this case, a terminal such as iPhone, iPad, iTouch and Mac computers obtains the M3U8 index file from the HTTP server via the HTTP protocol, and further obtains the TS slice files according to the Uniform Resource Locator (URL) provided in the M3U8 index file, thereby playing the streaming media. Because the streaming media data are transmitted as per the HTTP protocol, the firewall or proxy would not cause any trouble to the transmission; moreover, the time length of a TS slice file is very short, so that the terminal may rapidly select and switch to a code rate so as to adapt to the playing under different bandwidth conditions. At present, however, many widely used terminals other than those from Apple Inc. are incapable of playing a media stream based on HLS protocol; moreover, the media stream based on HLS protocol cannot be played off line by even a terminal capable of playing a media stream based on HLS protocol. As a result, the video watching experience of a user will be severely degraded.

SUMMARY OF THE INVENTION

Therefore, the embodiments of the present disclosure provide a method and a device for playing streaming media, and a non-transitory storage medium, to allow a user terminal to efficiently obtain streaming media.

On a first aspect, an embodiment of the present disclosure provides a method for playing streaming media, and the method includes:

obtaining an index file of a media stream, wherein the media stream includes the index file and at least two slice files, and time information and address information of each of the at least two slice files are recorded in the index file;

obtaining all slice files of the media stream according to the index file;

combining and converting all the slice files obtained into a local media file; and playing the local media file by a local media player;

where, the local media file is of a format supported by the local media player.

On a second aspect, an embodiment of the present disclosure further provides a device for playing streaming media, and the device includes:

an index file obtaining module, configured to obtain an index file of a media stream, wherein the media stream includes the index file and at least two slice files, and time information and address information of each of the at least two slice files are recorded in the index file;

a slice file obtaining module, configured to obtain all slice files of the media stream according to the index file;

a converting module, configured to combine and convert all the slice files obtained into a local media file; and a playing module, configured to play the local media file by a local media player;

where, the local media file is of a format supported by the local media player.

On a third aspect, an embodiment of the present disclosure further provides a non-transitory storage medium containing computer-executable instructions, which, when executed by a computer processor, are configured to perform a method for playing streaming media, wherein, the method comprises:

obtaining an index file of a media stream, wherein the media stream includes the index file and at least two slice files, and time information and address information of each of the at least two slice files are recorded in the index file;

obtaining all slice files of the media stream according to the index file;

combining and converting all the slice files obtained into a local media file; and playing the local media file by a local media player;

where, the local media file is of a format supported by the local media player.

In comparison with the prior art, the embodiments of the present disclosure are advantageous in that: all the obtained slice files are combined and converted into a local media file, which may be played by a local media player, so that a media stream of a format not supported by the local media player can be played on the terminal, thus the streaming media watching experience of a user may be improved.

BRIEF DESCRIPTION OF THE DRAWINGS

In order to more clearly illustrate the technical solutions of the embodiments of the present disclosure, the drawings used for the description of the embodiments will be briefly introduced below. However, the drawings accompanying to the description below illustrate only some embodiments of the present disclosure, and modifications and substitutions may be further made to these drawings by one of ordinary skills in the art without creative work.

DETAILED DESCRIPTION OF THE EMBODIMENTS

Figure 1:
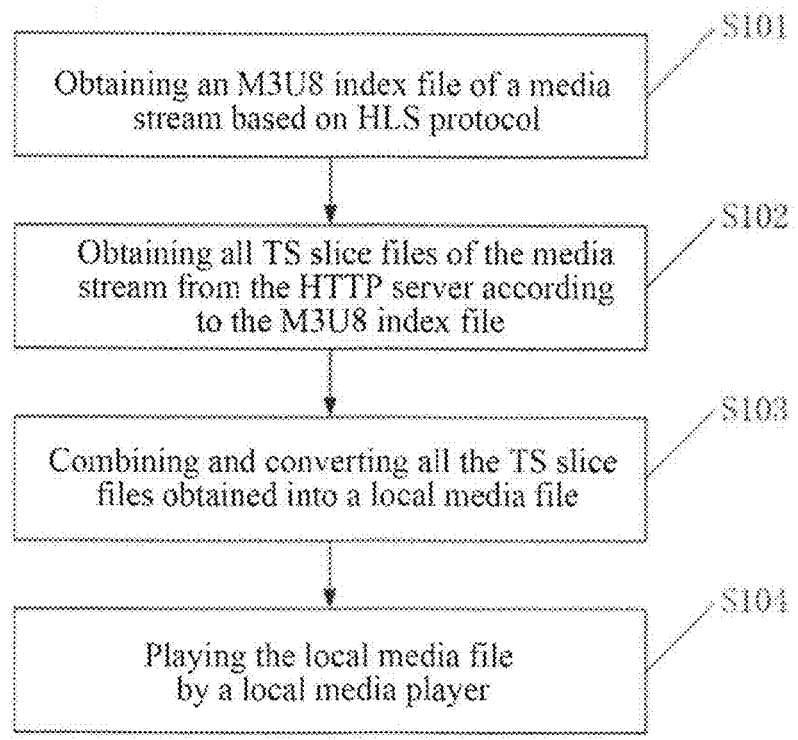
FIG. 1 is a schematic flow chart of a method for playing streaming media according to a first embodiment of the present disclosure.

The present disclosure will be illustrated in detail below in conjunction with the drawings and embodiments. It may be understood that the specific embodiments described here are only used to explain the present disclosure, rather than limiting the present disclosure. In addition, it should be noted that only the parts related to the present disclosure, rather than the whole contents, are shown in the drawings, for the sake of brief description.

The method for playing streaming media and the device for playing streaming media according to the embodiments of the present disclosure may be applicable to a terminal with an operating system such as Android (i.e. an operating system platform developed by Google Inc. for portable mobile intelligent equipments), iOS (i.e. an operating system platform developed by Apple Inc. for portable mobile intelligent equipments) and Windows Phone (i.e. an operating system platform developed by Microsoft Inc. for portable mobile intelligent equipments), and the terminal, which may be any one of an intelligent mobile phone, a tablet PC, a personal digital assistant, a laptop computer and a desk-top computer, typically includes a combination of a part of all of a central processing unit, a storage device, a switching device, a power supply, a clock signal generator, an image processor and a sound processor. The above combination of a part of all of a central processing unit, a storage device, a switching device, a power supply, a clock signal generator, an image processor and a sound processor is used for embodying the method for playing streaming media and the functions of the device for playing streaming media according to the embodiments of the present disclosure.

In the method for playing streaming media and the device for playing streaming media according to the embodiments of the present disclosure, the relevant media stream includes an index file and at least two slice files, and time information and address information of each of the at least two slice files are recorded in the index file. The embodiments below are illustrated based on an illustrative media stream based on HLS protocol, but it may be understood by one skilled in the art that the technical solutions of the embodiments of the present disclosure are also applicable to media streams based on other protocols not supported by the terminal. In the case of the media stream based on HLS protocol, the index file is an M3U8 index file, and the slice file is a TS file.

Figure 2:
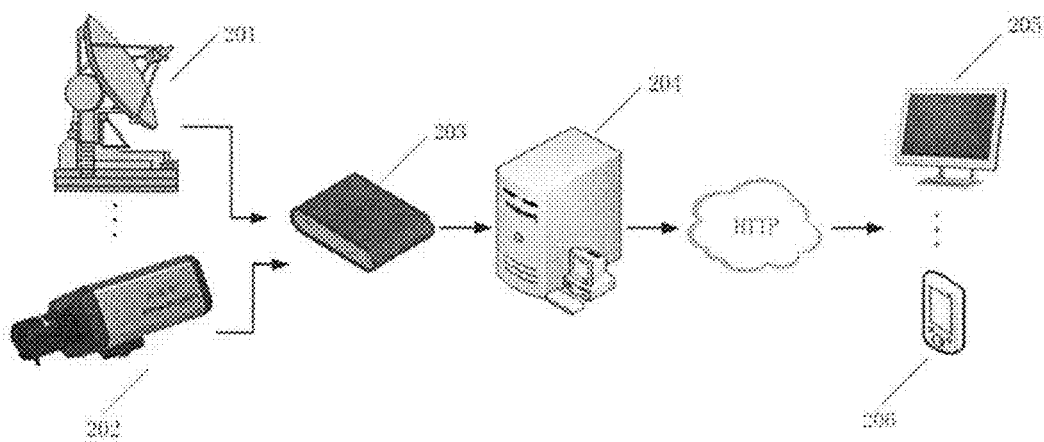
FIG. 2 is a structural representation of a streaming media transmission system based on HLS protocol according to the first embodiment of the present disclosure.

FIGS. 1-2 show the first embodiment of the present disclosure.

FIG. 1 is a schematic flow chart of a method for playing streaming media according to the first embodiment of the present disclosure. Referring to FIG. 1, the method includes the following Steps S101-S104.

Step S101: obtaining an M3U8 index file of a media stream based on HLS protocol.

FIG. 2 is a structural representation of a streaming media transmission system based on HLS protocol according to the first embodiment of the present disclosure. Referring to FIG. 2, a satellite 201 that transmits streaming media or a camera 202 that captures streaming media transfers the streaming media to an encoding and slicing means 203, which encodes and encapsulates the received streaming media to generate a TS file, slices the TS file into a plurality of successive TS segment files each with a fixed length via a slicing tool so as to obtain TS slice files, and generates an M3U8 index file corresponding to the TS slice files; an HTTP server 204 receives and stores the media stream based on HLS protocol that is sent by the encoding and slicing means 203 and includes the TS slice files and the M3U8 index file; and a desk-top computer 205 or an intelligent mobile phone 206 successively downloads the TS slice files from the HTTP server 204 and plays the TS slice files.

In this embodiment, a media play request, which may be an HTTP request, may be sent wirelessly to the HTTP server storing the TS slice files and the M3U8 index file; then, a reply in response to the media play request is received from the HTTP server, where the reply contains the M3U8 index file of a media stream based on HLS protocol corresponding to the media play request. At least two pieces of time information, as well as time information (i.e. playing time length) and address information (i.e. an URL for locating the TS slice file) of a TS slice file corresponding to each of the at least two pieces of time information are recorded in the M3U8 index file.

Step S102: obtaining all TS slice files of the media stream from the HTTP server according to the M3U8 index file.

In Step S102, the M3U8 index file is parsed according to an M3U format and a UTF-8 character coding format, to determine the address information of each TS slice file of the media stream; then, a TS slice file obtaining request, which includes the address information of all the TS slice files, is sent to the HTTP server; and subsequently each TS slice file sent by the HTTP server according to the request is received.

For example, an M3U8 index file of a media stream based on HLS protocol may be described as:

```
#EXTM3U
#EXT-X-MEDIA-SEQUENCE:6
#EXT-X-TARGETDURATION:10
#EXTINF:10,
http://live.example.com/1.ts
#EXTINF:10,
http://live.example.com/2.ts
#EXTINF:10,
http://live.example.com/3.ts
```

By parsing the above M3U8 index file, it may be determined that the M3U8 index file involves 3 TS slice files, the name information of which are respectively 1.ts, 2.ts and 3.ts, the time information (i.e. playing time lengths) of which are respectively 10 second, 10 second and 10 second, and the address information (i.e. URLs) of which are respectively http://live.example.com/1.ts, http://live.example.com/2.ts and http://live.example.com/3.ts.

Step S103: combining and converting all the obtained TS slice files into a local media file.

Specifically, Step S103 may include: after all the TS slice files are obtained from the HTTP server, combining all the TS slice files into a complete TS file according to the time information in the M3U8 index file, then converting the complete TS file into a local media file of a format supported by the local media player. Herein, such conversion may be realized according to the TS encapsulating format standard and a media format standard supported by the local media player. For example, the complete TS file may be converted into a local media file of a FlashVideo (FLU) format supported by the local Flash player. Of course, the local media file may be of another format such as Moving Pictures Experts Group (MPEG), MPG, DAT, Audio Video Interleaved (AVI), MOV and 3GP supported by the local media player.

Step S104: playing the local media file by the local media player.

In this embodiment, the local media player is a streaming media player installed on the terminal, and the local media file is of the format supported by the local media player.

In the first embodiment of the present disclosure, all the obtained TS slice files are combined and converted into a local media file which may be played by the local media player, so that widely used terminals in addition to those from Apple Inc. can also play a media stream based on HLS protocol.

Figure 3:
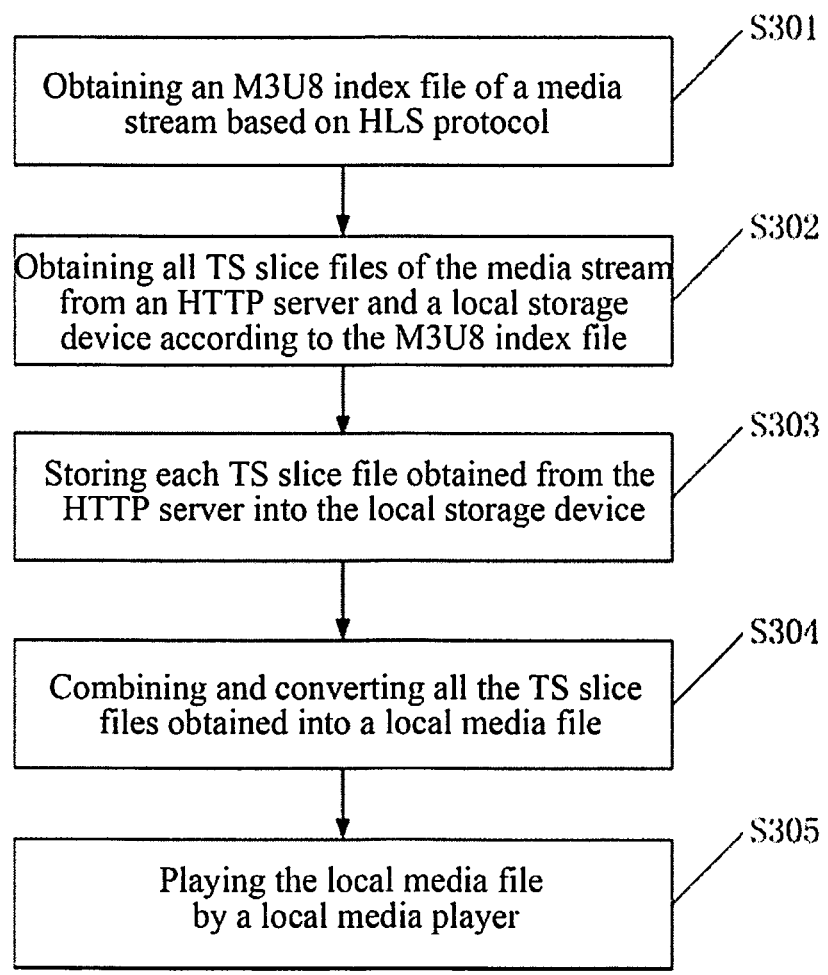
FIG. 3 is a schematic flow chart of a method for playing streaming media according to a second embodiment of the present disclosure.
Figure 4:
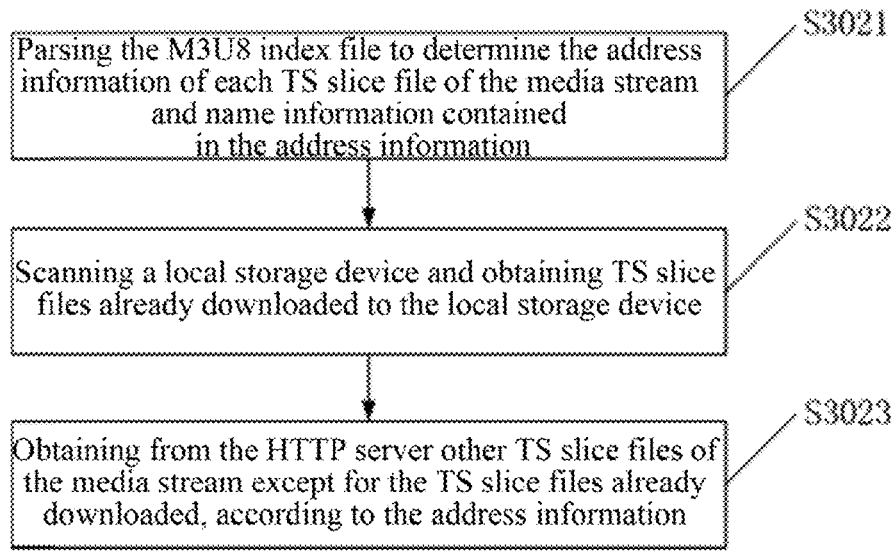
FIG. 4 is a schematic flow chart showing the process of obtaining TS slice files of the media stream from an HTTP server according to the M3U8 index file, according to the second embodiment of the present disclosure.

FIGS. 3-4 show the second embodiment of the present disclosure.

FIG. 3 is a schematic flow chart of a method for playing streaming media according to the second embodiment of the present disclosure. Referring to FIG. 3, the method includes the following Steps S301-S305.

Step S301: obtaining an M3U8 index file of a media stream based on HLS protocol.

This Step S301 is the same as Step S101 of the first embodiment, and will not be described again here.

Step S302: obtaining all TS slice files of the media stream from an HTTP server and a local storage device according to the M3U8 index file.

FIG. 4 is a schematic flow chart showing the obtaining of all TS slice files of the media stream from an HTTP server and a local storage device according to the M3U8 index file, according to the second embodiment of the present disclosure. Referring to FIG. 4, Step S302 further includes:

Substep S3021: parsing the M3U8 index file to determine address information of each TS slice file of the media stream and name information contained in the address information;

Substep S3022: scanning the local storage device, and obtaining TS slice files already downloaded to the local storage device, where the TS slice files already downloaded have names the same as those of the TS slice files of the media stream; and Substep S3023: obtaining, from the HTTP server, other TS slice files except for the TS slice files already downloaded according to the address information.

In Substep S3023, a TS slice file obtaining request, which includes the address information of other TS slice files except for the TS slice files already downloaded, is sent to the HTTP server; then, the TS slice files sent by the HTTP server according to the request are received.

Step S303: storing each TS slice file obtained from the HTTP server in the local storage device.

After all the TS slice files of the media stream are obtained according to the M3U8 index file, each TS slice file obtained from the HTTP server is stored in the local storage device, which may be an external storage device (for example, a local disk) or an internal memory. Because the internal memory is generally used for storing the codes needed for CPU operations, each TS slice file is preferably stored in a local disk, in order to relieve the burden of the internal memory without any negative influence on the operation speed of the CPU.

Step S304: combining and converting all the obtained TS slice files into a local media file.

This Step S304 is the same as Step S103 of the first embodiment, and will not be described again here.

Step S305: playing the local media file by a local media player.

This Step S305 is the same as Step S104 of the first embodiment, and will not be described again here.

In this embodiment, the precedence order of Step S303 and Steps S304-S305 is not limited. That is, Steps S304-S305 may be performed first before Step S303; or, Step S304 is performed before Step S303, and then Step S305 is performed finally.

In the second embodiment of the present disclosure, all the obtained TS slice files are combined and converted into a local media file which may be played by a local media player, so that other widely used terminals in addition to terminals from Apple Inc. can also support the playing of a media stream based on HLS protocol; further, all the TS slice files are stored in the local storage device, it is unnecessary to obtain the TS slice files from the HTTP server again to play the HLS media again subsequently, instead, the TS slice files stored in the local storage device may be searched out directly. Thus, the inventive method is not limited by the network environment, the network traffic may be saved, and the video watching experience of a user may be greatly improved.

Figure 5:
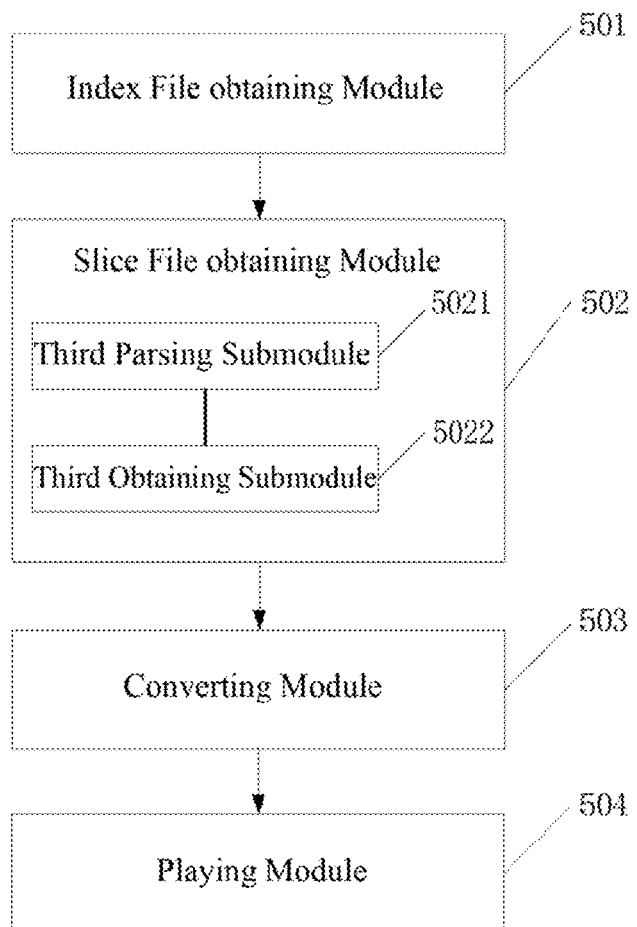
FIG. 5 is a structural representation of a device for playing streaming media according to a third embodiment of the present disclosure.

FIG. 5 shows the third embodiment of the present disclosure.

FIG. 5 is a structural representation of a device for playing streaming media according to the third embodiment of the present disclosure. Referring to FIG. 5, the device includes: an index file obtaining module 501, a slice file obtaining module 502, a converting module 503 and a playing module 504.

The index file obtaining module 501 is configured to obtain an index file of a media stream. Here, the media stream includes the index file and at least two slice files, and time information and address information of each of the at least two slice files are recorded in the index file. The slice file obtaining module 502 is configured to obtain each slice file of the media stream according to the index file. The converting module 503 is configured to combine and convert all the obtained slice files into a local media file. The playing module 504 is configured to play the local media file by a local media player. Herein, the local media file is of a format supported by the local media player.

The above embodiment is preferably applicable to a media stream based on HLS protocol, in this case, the index file is an M3U8 index file, and the slice files are TS slice files. The TS slice file may be obtained from an HTTP server.

In this embodiment, the index file obtaining module 501 may send wirelessly a media play request, which is an HTTP request, to an HTTP server storing the TS slice files and the M3U8 index file; then, the index file obtaining module 501 receives a reply provided by the HTTP server in response to the above media play request, where the reply contains an M3U8 index file of a media stream based on HLS protocol corresponding to the media play request. At least two pieces of time information, as well as the time information (i.e. playing time length) and the address information (e.g. an URL for locating the TS slice file) of a TS slice file corresponding to each of the at least two pieces of time information are recorded in the M3U8 index file.

In this embodiment, the slice file obtaining module 502 may specifically include:

a third parsing submodule 5021, configured to parse the index file to determine the address information of each slice file of the media stream; preferably, the M3U8 index file is preferably parsed according to an M3U format and a UTF-8 character coding format, to determine the address information of each TS slice file of the media stream; and a third obtaining submodule 5022, configured to obtain all the slice files from the server, preferably the HTTP server, according to the address information of the slice files of the media stream.

Specifically, the third obtaining submodule 5022 sends a TS slice file obtaining request, which includes the address information of all the TS slice files, to the HTTP server, and then receives all the TS slice files sent by the HTTP server according to the request.

In this embodiment, after the slice file obtaining module 502 obtains all the slice files, the converting module 503 specifically combines all the obtained slice files into a complete file according to the time information, and converts the complete file into a local media file of a format supported by the local media player. Preferably, the converting module 503 combines all the TS slice files into a complete TS file according to the time information recorded in the M3U8 index file, and then converts the complete TS file into a local media file of a format supported by the local media player. Herein, the conversion may be realized according to the TS encapsulating format standard and a media format standard supported by the local media player. For example, the converting module 503 converts the complete TS file into a local media file of an FLV format supported by the local Flash player. Of course, the local media file may be another format supported by the local media player, such as MPEG, MPG, DAT, AVI, MOV and 3GP.

In the third embodiment of the present disclosure, all the obtained TS slice files are combined and converted into a local media file, which may be played by the local media player, so that other widely used terminals in addition to terminals from Apple Inc. can also support the playing of a media stream based on HLS protocol.

Figure 6:
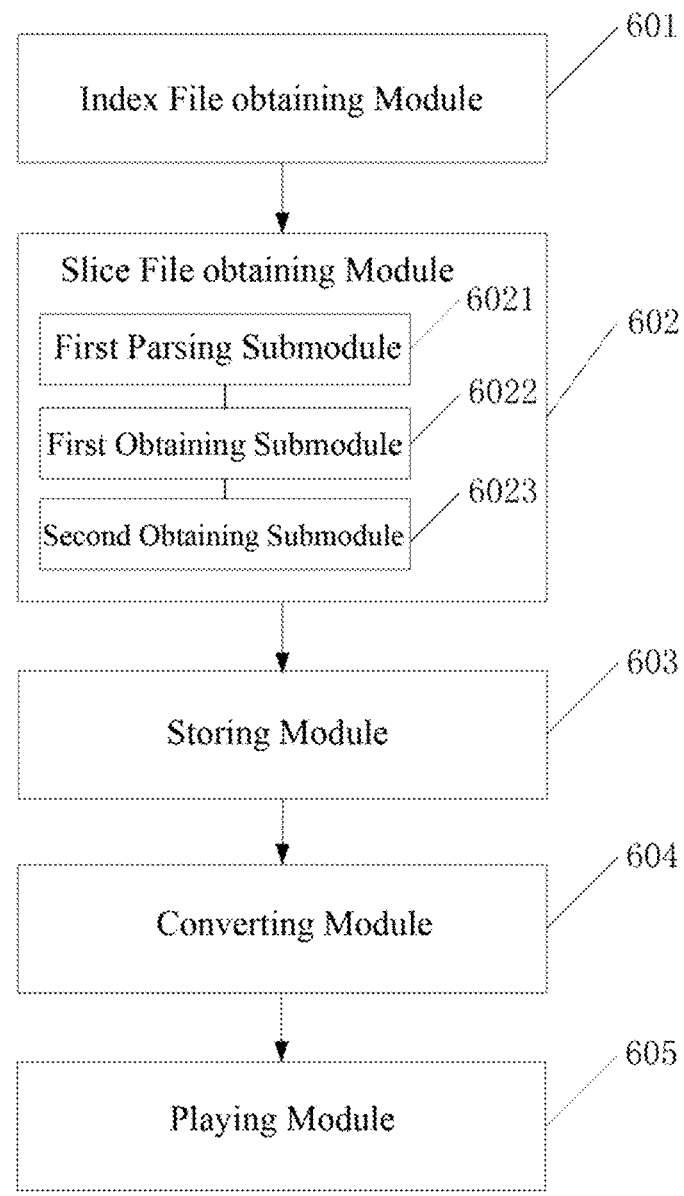
FIG. 6 is a structural representation of a device for playing streaming media according to a fourth embodiment of the present disclosure.

FIG. 6 shows the fourth embodiment of the present disclosure.

FIG. 6 is a structural representation of a device for playing streaming media according to the fourth embodiment of the present disclosure. Referring to FIG. 6, the device includes: an index file obtaining module 601, a slice file obtaining module 602, a storing module 603, a converting module 604 and a playing module 605.

The index file obtaining module 601 is configured to obtain an M3U8 index file of a media stream based on HLS protocol. The slice file obtaining module 602 is configured to obtain all TS slice files of the media stream from an HTTP server and a local storage device according to the M3U8 index file. The storing module 603 is configured to store TS slice files of the media stream obtained by the slice file obtaining module 602 from the HTTP server in the local storage device. The converting module 604 is configured to combine and convert all the obtained TS slice files into a local media file. The playing module 605 is configured to play the local media file by a local media player. Herein, the local media file is of a format supported by the local media player.

In this embodiment, the function of the index file obtaining module 601 is the same as that of the index file obtaining module 501 in the third embodiment, the function of the converting module 604 is the same as that of the converting module 503 in the third embodiment, and the function of the playing module 605 is the same as that of the playing module 504 in the third embodiment, thus will not be described in detail again here.

In this embodiment, the slice file obtaining module 602 specifically includes:

a first parsing submodule 6021, configured to parse the index file to determine the address information of each slice file of the media stream and the name information contained in the address information, and preferably configured to parse the M3U8 index file to determine the address information of each TS slice file of the media stream and the name information contained in the address information;

a first obtaining submodule 6022, configured to scan a local storage device to obtain the slice files already downloaded to the local storage device, where the slice files already downloaded have names the same as those of the slice files of the media stream, and these slice files already downloaded are specifically TS slice files; and a second obtaining submodule 6023, configured to obtain, from the server, other slice files of the media stream except for the slice files already downloaded according to the address information; preferably, said other slice files are downloaded from the HTTP server.

Specifically, the second obtaining submodule 6023 sends a TS slice file obtaining request, which includes the address information of other TS slice files except for the TS slice files already downloaded, to the HTTP server, and then receives the TS slice files sent by the HTTP server according to the request.

The storing module 603 is configured to store each slice file obtained by the slice file obtaining module into the local storage device. In this embodiment, the storing module 603 is configured to store each TS slice file obtained from the HTTP server into the local storage device, which may be an external storage device (for example, a local disk) or an internal memory. Because the internal memory is generally used for storing the codes needed for CPU operations, the storing module 603 preferably stores all the TS slice files to the local disk, in order to relieve the burden of the internal memory without any negative influence on the operation speed of the CPU.

In the fourth embodiment of the present disclosure, all the obtained TS slice files are combined and converted into a local media file which may be played by a local media player, so that other widely used terminals in addition to terminals from Apple Inc. can also support the playing of a media stream based on HLS protocol; further, all the TS slice files are stored in the local storage device, it is unnecessary to obtain the TS slice files from the HTTP server again to play the HLS media again subsequently, instead, the TS slice files stored in the local storage device may be searched out directly. Thus, the inventive method is not limited by the network environment, the network traffic may be saved, and the video watching experience of a user may be greatly improved.

An embodiment of the present disclosure further provides a non-transitory storage medium containing computer-executable instructions, which, when executed by a computer processor, are configured to perform a method for playing streaming media, where the method includes:

obtaining an index file of a media stream, where the media stream includes the index file and at least two slice files, and time information and address information of each of the at least two slice files are recorded in the index file;

obtaining all slice files of the media stream according to the index file;

combining and converting all the obtained slice files into a local media file; and playing the local media file by a local media player.

Herein, the local media file is of a format supported by the local media player.

The executable instructions stored in the storage medium may be instructions that are configured to perform a method for playing streaming media according to any embodiment of the present disclosure.

With the description of the above embodiments, one skilled in the art may clearly understand that the present disclosure may be implemented by the aid of software and necessary universal hardware; of course, the present disclosure may be implemented by hardware merely. However, in many cases, the former is preferred. Based on such an understanding, the essential part of the technical solutions of the present disclosure, or in other words, the part that contributes to the prior art, may be embodied in the form of a software product that is stored in a computer-readable storage medium, for example, floppy disk, Read-Only Memory (ROM), Random Access Memory (RAM), FLASH, hard disk or compact disc of a computer, and includes instructions for instructing a computer device (which may be a personal computer, a server or a network device) to implement the methods according to the above embodiments of the present disclosure.

The above description only shows some preferred embodiments of the present disclosure, rather than limiting the scope of the present disclosure. All modifications, equivalent substitutions and improvements made without departing from the concept and principles of the present disclosure should fall within the scope of the present disclosure.

What is claimed is:

1. A method for playing streaming media, comprising:
   sending a media play request to a server and obtaining an index file of a media stream from the server, wherein the media stream comprises the index file and at least two slice files, and time information and address information of each of the at least two slice files are recorded in the index file;
   obtaining all slice files of the media stream according to the index file;
   combining and converting all the slice files obtained into a local media file; and
   playing the local media file by a local media player;
   wherein the local media file is of a format supported by the local media player;
   wherein obtaining all slice files of the media stream according to the index file comprises:
     parsing the index file to determine the address information of each slice file of the media stream and name information contained in the address information;
     scanning a local storage device, and obtaining slice files already downloaded to the local storage device, wherein the slice files already downloaded have names the same as those of slice files of the media stream; and
     obtaining, from the server, other slice files of the media stream except for the slice files already downloaded according to the address information.

2. The method for playing streaming media according to claim 1, wherein combining and converting all the slice files obtained into the local media file comprises:
   combining all the slice files obtained into a complete file according to the time information; and
   converting the complete file into the local media file of the format supported by the local media player.

3. The method for playing streaming media according to claim 1, wherein obtaining all the slice files of the media stream according to the index file comprises:
   parsing the index file to determine the address information of each slice file of the media stream; and
   obtaining each slice file from the server according to the address information of the slice file of the media stream.

4. The method for playing streaming media according to claim 1, wherein, after obtaining all slice files of the media stream according to the index file, the method further comprises:
   storing all the slice files obtained from the server into the local storage device.

5. The method for playing streaming media according to claim 1, wherein, the media stream is based on Hypertext Transfer Protocol Live Streaming protocol, the index file is an M3U8 index file, and the slice file is a Transport Stream slice file.

6. The method for playing streaming media according to claim 1, wherein, the local media file is of an FLV format, and the local media player is a Flash player.

7. A device for playing streaming media, comprising a processor and a memory storing program codes, wherein the processor is configured to execute the stored program codes to:
   send a media play request to a server and obtain an index file of a media stream from the server, wherein the media stream comprises the index file and at least two slice files, and time information and address information of each of the at least two slice files are recorded in the index file;
   obtain all slice files of the media stream according to the index file;
   combine and convert all the slice files obtained into a local media file; and
   play the local media file by a local media player;
   wherein the local media file is of a format supported by the local media player;
   wherein the processor further performs the stored program codes to:
     parse the index file to determine the address information of each slice file of the media stream and name information contained in the address information;
     scan a local storage device and obtain slice files already downloaded to the local storage device, wherein the slice files already downloaded have names the same as those of slice files of the media stream; and
     obtain, from the server, other slice files of the media stream except for the slice files already downloaded, according to the address information.

8. The device for playing streaming media according to claim 7, wherein, the processor is further configured to execute the stored program codes:

combine all the slice files obtained into a complete file according to the time information; and convert the complete file into the local media file of the format supported by the local media player.

9. The device for playing streaming media according to claim 7, wherein, the processor is further configured to execute the stored program codes to:

parse the index file to determine the address information of each slice file of the media stream; and obtain each slice file from the server according to the address information of the slice file of the media stream.

10. The device for playing streaming media according to claim 7, wherein the processor is further configured to execute the stored program codes to store each slice file obtained into the local storage device.

11. The device for playing streaming media according to claim 7, wherein, the media stream is based on Hypertext Transfer Protocol Live Streaming protocol, the index file is an M3U8 index file, and the slice file is a Transport Stream slice file.

12. The device for playing streaming media according to claim 7, wherein, the local media file is of an FLV format, and the local media player is a Flash player.

13. A non-transitory storage medium containing computer-executable instructions, which, when executed by a computer processor, are configured to perform a method for playing streaming media, wherein, the method comprises:

sending a media play request to a server and obtaining an index file of a media stream from the server, wherein the media stream comprises the index file and at least two slice files, and time information and address information of each of the at least two slice files are recorded in the index file;

obtaining all slice files of the media stream according to the index file;

combining and converting all the slice files obtained into a local media file; and playing the local media file by a local media player wherein the local media file is of a format supported by the local media player;

wherein the method further comprises:

parsing the index file to determine the address information of each slice file of the media stream and name information contained in the address information;

scanning a local storage device and obtain slice files already downloaded to the local storage device, wherein the slice files already downloaded have names the same as those of slice files of the media stream; and obtaining, from the server, other slice files of the media stream except for the slice files already downloaded, according to the address information.

* * * * *